United States Patent [19]

Onodera et al.

[11] Patent Number: 5,653,846
[45] Date of Patent: Aug. 5, 1997

[54] LAMINATING APPARATUS

[75] Inventors: Kazuo Onodera, Ibaraki-ken; Hideaki Furukawa, Yokohama; Koji Nakamori, Wako; Noriaki Nakazawa, Yokohama, all of Japan

[73] Assignees: Canon Aptex Inc., Ibaraki-ken; Canon Kabushiki Kaisha, Tokyo, both of Japan

[21] Appl. No.: 389,625

[22] Filed: Feb. 15, 1995

Related U.S. Application Data

[63] Continuation of Ser. No. 974,298, Nov. 10, 1992, abandoned.

[30] Foreign Application Priority Data

Nov. 11, 1991 [JP] Japan .................... 3-322530
Nov. 11, 1991 [JP] Japan .................... 3-322531
Dec. 11, 1991 [JP] Japan .................... 3-350922

[51] Int. Cl.$^6$ ............................................. B32B 31/00
[52] U.S. Cl. .................. 156/362; 156/302; 156/353; 156/361; 156/522
[58] Field of Search .......................... 156/522, 357, 156/353, 362, 361, 324, 64, 302, 521, 552, 555

[56] References Cited

U.S. PATENT DOCUMENTS

| | | | |
|---|---|---|---|
| 4,659,419 | 4/1987 | Miyake | 156/522 |
| 4,680,079 | 7/1987 | Tanaka | 156/353 |
| 4,844,758 | 7/1989 | Hamamura et al. | 156/522 |
| 4,863,550 | 9/1989 | Matsuo et al. | 156/353 |
| 4,961,808 | 10/1990 | Candore | 156/522 |
| 4,964,937 | 10/1990 | Seki | 156/522 |
| 4,986,869 | 1/1991 | Tomisawa et al. | 156/522 |
| 5,049,227 | 9/1991 | Long et al. | 156/362 |
| 5,053,099 | 10/1991 | Seiki et al. | 156/522 |
| 5,240,545 | 8/1993 | Washizaki et al. | 156/522 |

*Primary Examiner*—Jay H. Woo
*Assistant Examiner*—Iurie A. Schwartz
*Attorney, Agent, or Firm*—Fitzpatrick, Cella, Harper & Scinto

[57] ABSTRACT

The present invention provides a laminating apparatus including a sheet conveyor for conveying a sheet to be laminated, a film conveyor for conveying an elongated laminate film, a pressurizer for overlapping the sheet and the laminate film and for pressurizing the sheet and the laminate film, a film cutter for cutting the laminate film overlapped with the sheet, a sheet detector for detecting the sheet conveyed by the sheet conveyor, and a controller for controlling the film cutter. The controller is so controlled that the laminate film is cut in registration with the leading and trailing ends of the sheet on the basis of detection by the sheet detector.

18 Claims, 8 Drawing Sheets

LAMINATING APPARATUS

This application is a continuation of application Ser. No. 07/974,298, filed Nov. 10, 1992, now abandoned.

BACKGROUND OF THE INVENTION

1. Field of the Invention

The present invention relates to a laminating apparatus used with an image forming apparatus such as a copying machine, a printer, a facsimile and the like and adapted to perform a laminating treatment for the purpose of improving the appearance and the preservation of a sheet and the like (object to be laminated) on which an image was formed.

2. Related Background Art

The laminating treatment effected by such a laminating apparatus generally comprises the step of sealingly covering both surfaces of a sheet-like object to be laminated by two laminate films. For example, the laminating treatment is effected in such a manner that the object to be laminated is introduced into the laminating apparatus from a supply table disposed at a side of the laminating apparatus, and the object to be laminated is conveyed together with upper and lower heat-reactive laminate films with the interposition of the object between the films, meanwhile the films are laminated to the object to be laminated from above and below by applying heat and pressure to the overlapped object and films.

In such laminating apparatuses, when an object having an indeterminate form (a strip-shaped object having an indefinite length) is laminated, conventionally, the start and stop of the laminating treatment was effected by an ON/OFF switch (manual switch). That is, when the switched was turned ON the laminating treatment was started, and when the switch was turned OFF the laminating treatment was stopped. In a condition that the switch was turned ON, the object to be laminated was set on the supply table.

However, in such a conventional technique, since the laminate films continued to be conveyed while the object having the indeterminate form to be laminated was being set on the supply table, a certain amount of laminate films was used in vain. Further, in such a conventional technique, since the laminate films could not be cut accurately in registration with leading and trailing ends of the object to be laminated after the laminating operation, an additional trimming operation for cutting off the excessive laminate films in registration with the configuration of the object was required, thus making the laminating treatment troublesome and wasting the laminate films.

SUMMARY OF THE INVENTION

The present invention aims to eliminate the above-mentioned conventional drawbacks, and an object of the present invention is to provide a laminating apparatus wherein a laminate film is not used in vain and the laminate film can be cut accurately in registration with leading and trailing ends of an object to be laminated after a laminating operation.

In order to achieve the above object, the present invention provides a laminating apparatus comprising sheet convey means for conveying a sheet to be laminated, film convey means for conveying an elongated laminate film, pressure means for overlapping the sheet conveyed by the sheet convey means and the laminate film conveyed by the film convey means and for pressurizing the overlapped sheet and laminate film, film cutting means for cutting the laminate film overlapped with the sheet, sheet detect means for detecting the sheet conveyed by the sheet convey means, and control means for controlling the film cutting means in such a manner that the laminate film is cut in registration with leading and trailing ends of the sheet, on the basis of the detection of the sheet detect means.

In this case, the sheet detect means may detect the leading end of the sheet being conveyed, and the control means may drive the film cutting means at a predetermined timing from the detection of the leading end of the sheet by means of the sheet detect means to cut the laminate sheet. Alternatively, the sheet detect means may detect the trailing end of the sheet being conveyed, and the control means may drive the film cutting means at a predetermined timing from the detection of the trailing end of the sheet by means of the sheet detect means to cut the laminate sheet.

With the arrangements as mentioned above, when the laminating treatment is effected with using an elongated laminate film, it is possible to cut the laminate film accurately in registration with the leading end or the trailing end of the sheet, thus avoiding the use of an uneconomical laminate sheet. Further, it is possible to prevent the erroneous cutting of the sheet.

Furthermore, in the present invention, a normal mode for performing the laminating treatment regarding a sheet of a fixed form or a continuous mode for performing the laminating treatment regarding a sheet of an indeterminate form may be selectively used.

In this case, a jam detect means is provided for detecting the jamming of the sheet, and when the normal mode is used the jam detect means may be operative and when the continuous mode is used the jam detect means may be inoperative. In this way, the laminating treatment even regarding long sheets other than the sheet of the fixed form can be effected conveniently, and thus, it is possible to provide a laminating apparatus which can handle various kinds of sheets.

DETAILED DESCRIPTION OF THE PREFERRED EMBODIMENTS

Figure 1:
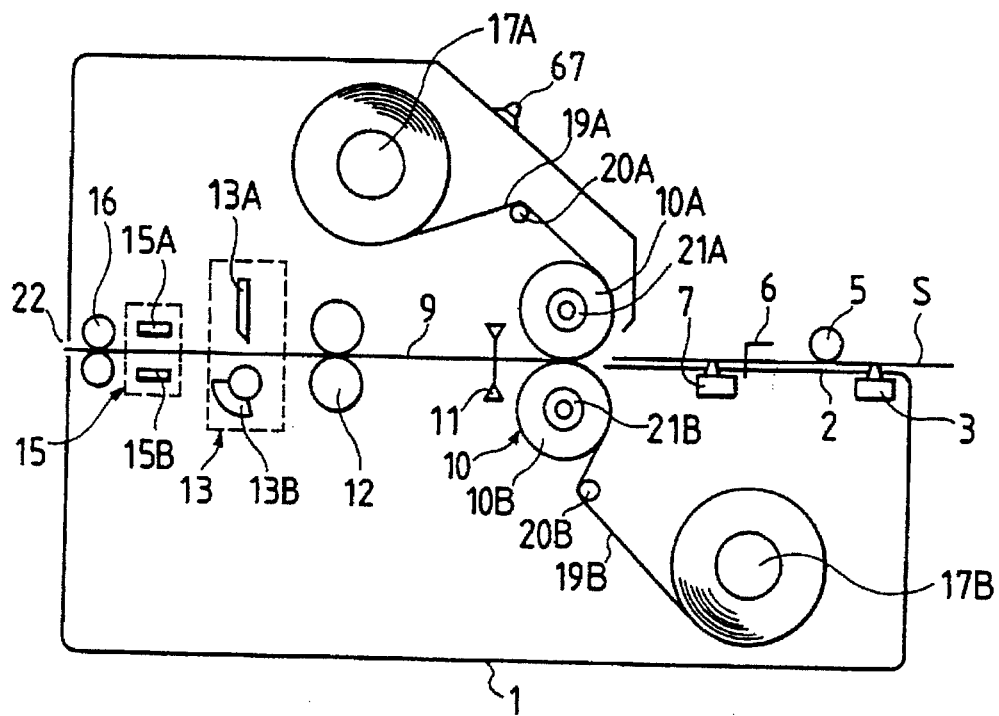
FIG. 1 is an elevational sectional view of a laminating apparatus according to a preferred embodiment of the present invention.

FIG. 1 shows the whole construction of a laminating apparatus according to the present invention.

The laminating apparatus comprises a body 1 having a horizontal sheet supply table 2 at its one side. A sheet (object to be laminated) S is introduced from the sheet supply table 2 into the body 1 of the laminating apparatus. Regarding the sheet supply table 2, there are arranged a first sheet detect sensor 3, a sheet supply roller 5, a register shutter 6 and a second sheet detect sensor 7 in order from an upstream side of the supply table.

Within the body 1 of the laminating apparatus, a horizontal sheet convey path 9 is formed contiguous to the sheet supply table 2. In the sheet convey path 9, there are arranged a pair of pressure rollers 10, a laminate film detect sensor 11, a pair of pull rollers 12, a laminate film cutting device 13, a sheet discharge detect sensor 15 and a pair of discharge rollers 16 in order from an upstream side of the path. Further, heat-reactive laminate films 19A, 19B are wound around rotatable drums 17A, 17B in roll forms are disposed above and below the sheet convey path 9, respectively. Leading (or tip) ends of the laminate films 19A, 19B are wound around the paired pressure rollers 10 via guide rollers 20A, 20B, respectively and then are pinched between a nip of the paired pull rollers 12.

The first sheet detect sensor 3 serves to detect whether there is the sheet S on the sheet supply table 2. The sheet supply roller 5 serves to supply the sheet S from the sheet supply table 2, and is rotatingly driven in a clockwise direction (FIG. 1) when the sheet S is detected by the first sheet detect sensor 3.

The register shutter 6 serves to correct the skew-feed of the sheet S supplied by the sheet supply roller 5, and is retracted from the sheet convey path 9 when a predetermined loop is formed in a front portion of the sheet S. The register shutter 6 is driven by a solenoid (not shown). The second sheet detect sensor 7 serves to detect a leading end and a trailing end of the sheet S supplied from the sheet supply table 2.

The pair of pressure rollers 10 are rotated at a predetermined rotating speed to convey the sheet S supplied from the sheet supply table 2 and the laminate films 19A, 19B unwound from the rotatable drums 17A, 17B together and to pressurize these members S, 19A, 19B with a predetermined pressure. Each roller 10A, 10B of the paired pressure rollers 10 has a laminate heater 21A, 21B of roller type attached to a shaft of the roller, so that the laminate films 19A, 19B conveyed by the paired pressure rollers 10 are heated by the heat from the laminate heaters 21A, 21B at a predetermined temperature. The heats from the laminate heaters 21A, 21B are transmitted to the rollers 10A, 10B.

The laminate film detect sensor 11 serves to detect whether the laminate films 19A, 19B are situated at predetermined positions or not.

The pair of pull rollers 12 serve to hold the leading end portions of the laminate films 19A, 19B fed from the rotatable drums 17A, 17B to apply a predetermined tension force to the sheet S which has been laminated and which exists between the paired pressure rollers 10 and the paired pull rollers 12. To this end, the peripheral speed of each pull roller 12 is so selected to be slightly greater than the peripheral speed of each pressure roller 10.

Each of the rotatable drums 17A, 17B on which the laminate films 19A, 19B are wound is subjected to a predetermined load in a film feeding direction, thereby applying a predetermined tension force to a film portion between the corresponding pressure roller and the corresponding drum.

The laminate film cutting device 13 serves to cut the laminate films 19A, 19B in registration with the leading end and the trailing end of the laminated sheet S. The laminate film cutting device 13 comprises an upper fixed cutter 13A disposed above the sheet convey path 9, a lower rotating cutter 13B (when engaged by the upper cutter, the laminate films are cut), and a cutter solenoid (not shown). When the cutter of rotary type is used as in this laminate film cutting device 13, the laminate films can be cut without interfering with the conveyance of the sheet S.

The pair of discharge rollers 16 serve to eject or discharge the laminated sheet S out of the apparatus through a discharge opening 22.

The sheet discharge detect sensor 15 is an optical sensor of permeable type comprising a light emitting portion 15A disposed above the sheet convey path 9 and a light receiving portion 15B disposed below the sheet convey path 9. When the light emitted from the light emitting portion 15A is interrupted by the sheet S, the light receiving portion 15B generates a detection signal. When the sheet S has passed through the light, the light receiving portion 15B receives the light again, thereby generating a discharge signal. Incidentally, the sheet discharge detect sensor 15 also serves as a jam detect sensor for the sheet S.

Figure 2:
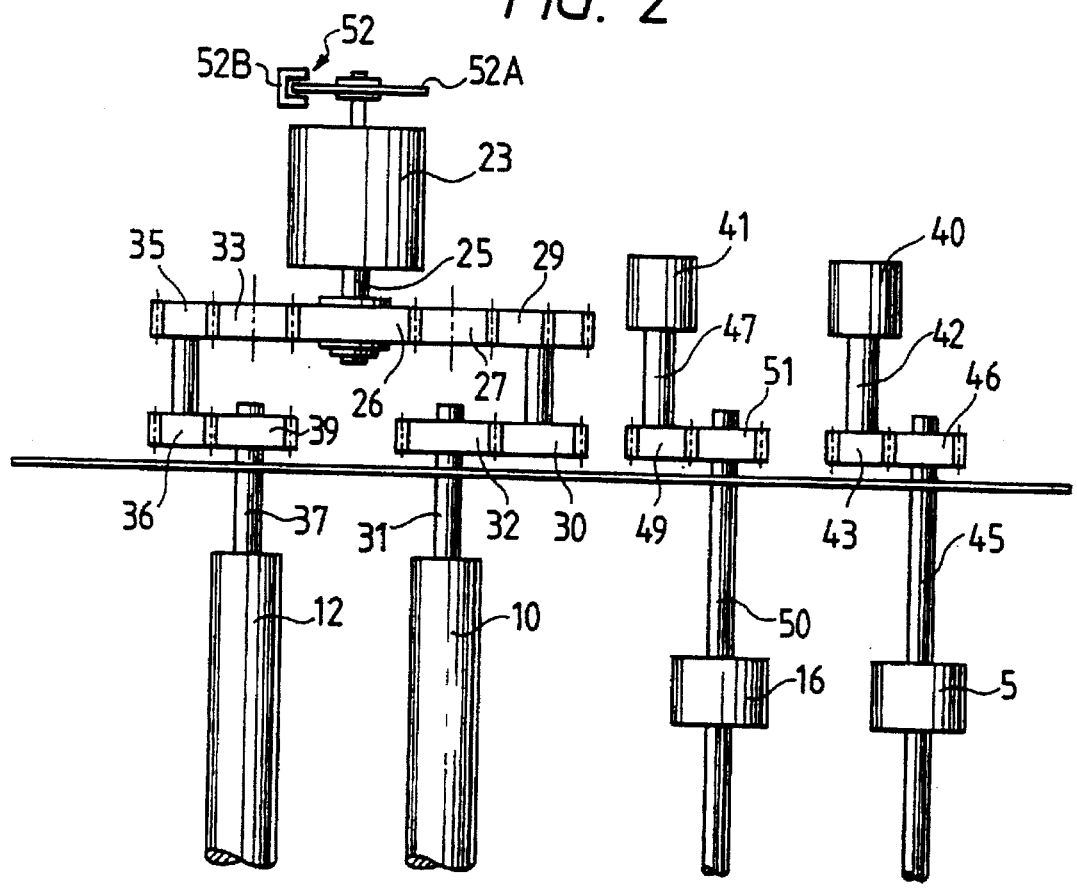
FIG. 2 is a view showing a drive system provided in the apparatus of FIG. 1.

FIG. 2 shows a drive mechanism for the sheet supply roller 5, paired pressure rollers 10, paired pull rollers 12 and paired discharge rollers 16 of the laminating apparatus.

The paired pressure rollers 10 and the paired pull rollers 12 are rotatingly driven by driving forces from the same drive motor (main motor) 23. The rotation of a drive gear 26 secured to an output shaft 25 of the drive motor 23 is transmitted to a pressure roller gear 32 secured to a roller shaft 31 of one of the paired pressure rollers 10 via idler gears 27, 29, 30, and is transmitted to a pull roller gear 39 secured to a roller shaft 37 of one of the paired pull rollers 12 via idler gears 33, 35, 36.

The sheet supply roller 5 and the paired discharge rollers 16 are rotatingly driven by driving forces from respective drive motors 40, 41. The rotation of a drive gear 43 secured to an output shaft 42 of the drive motor 40 is transmitted to a sheet supply roller gear 46 secured to a roller shaft 45 of the sheet supply roller 5, and the rotation of a drive gear 49 secured to an output shaft 47 of the drive motor 41 is transmitted to a sheet discharge roller gear 51 secured to a roller shaft 50 of one of the paired discharge rollers 16.

Incidentally, the drive motor 23 is provided with a clock device 52 for outputting a clock signal by utilizing the rotation of the output shaft 25 of this drive motor. The clock device 52 comprises a clock disk 52A having a plurality of radial slits (not shown) equidistantly arranged in a circumferential direction of the disk, and a clock sensor (optical sensor of permeable type) 52B for detecting the number of slits in the rotating clock disk 52A. The clock disk 52A is secured to the output shaft 25 of the drive motor and the clock sensor 52B is disposed near the clock disk 52A.

Now, a laminating operation of the laminating apparatus will be briefly described with reference to FIG. 1.

When the sheet S is rested on the sheet supply table 2, the existence of the sheet S is detected by the first sheet detect sensor 3. Consequently, the sheet supply roller 5 is rotated in the clockwise direction in FIG. 1 to supply the sheet S. After the skew-feed of the supplied sheet S is corrected by the register shutter 6, the sheet S is conveyed until the leading end of the sheet enters into a nip between the paired pressure rollers 10. The leading end and the trailing end of the supplied sheet S are detected by the second sheet detect sensor 7. After the sheet S has been supplied in this way, the paired pressure rollers 10, the paired pull rollers 12 and the paired discharge rollers 16 start to be rotated for the preparation for the laminating treatment.

Due to the rotations of the pressure rollers 10, the sheet S is conveyed toward a downstream direction while being sandwiched between the laminate films 19A, 19B. In this case, the upper and lower laminate films 19A, 19B are also fed out from the respective drums by the pressure rollers 10 gradually. Thus, the laminate films pinching the sheet S therebetween are heated by the laminate heaters 21A, 21B and are pressurized by the paired pressure rollers 10. As a result, the upper and lower surfaces of the sheet S are sealed by the laminate films 19A, 19B, respectively.

When the leading end of the laminated sheet S has passed through the pair of pull rollers 12 and reaches the laminate film cutting device 13, the latter is driven to cut the excessive laminate films 19A, 19B in registration with the leading end of the sheet. When the trailing end of the laminated sheet S has passed through the pair of pull rollers 12 and reaches the laminate film cutting device 13, the latter is driven to cut the laminate films 19A, 19B in registration with the trailing end of the sheet, thereby separating the laminated sheet from non-used laminate films 19A, 19B. Thereafter, the laminated sheet S separated from the non-used laminate films 19A, 19B is discharged out of the laminating apparatus through the discharge opening 22 by the pair of discharge rollers 16.

Figure 3:
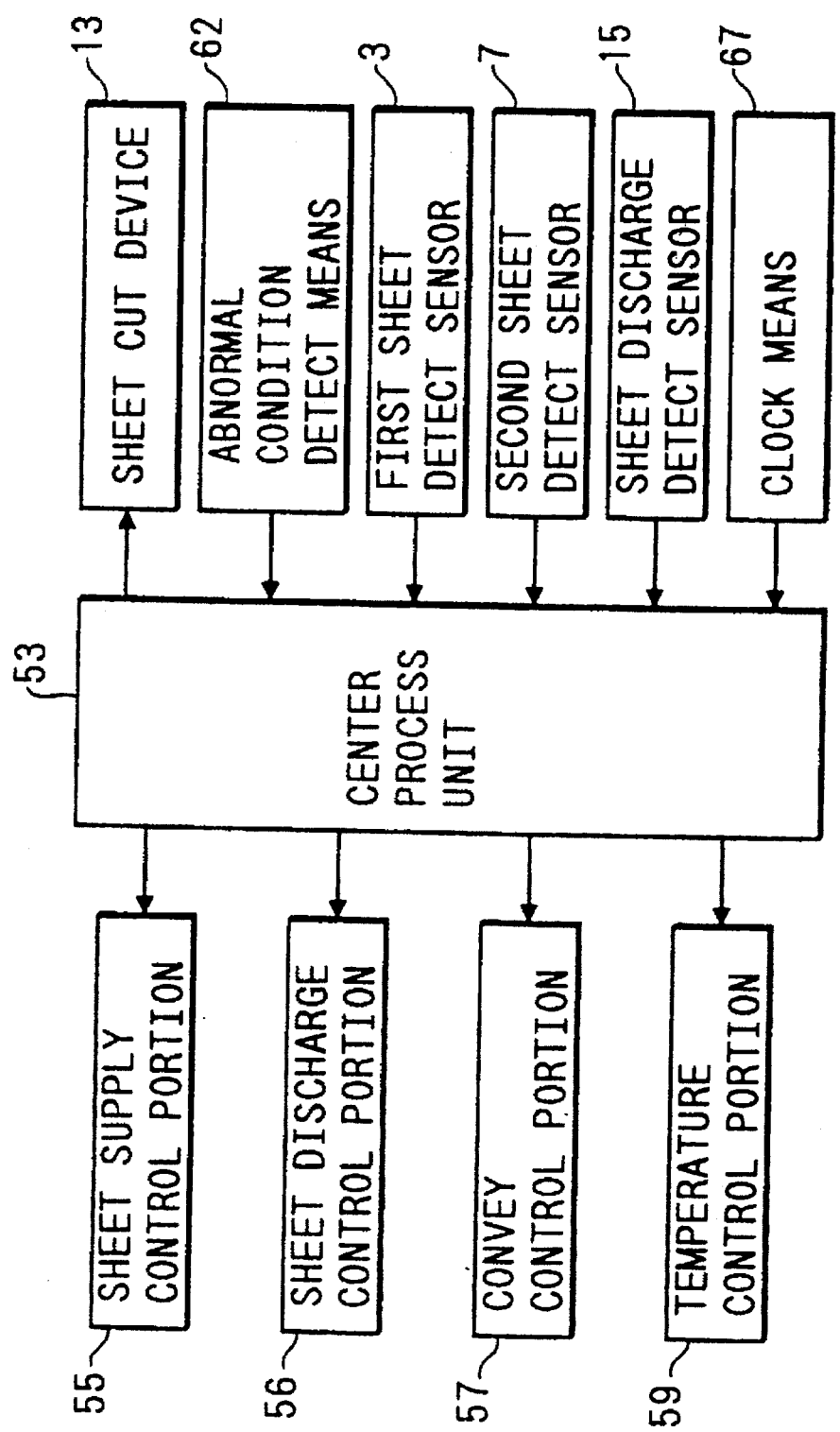
FIG. 3 is a block diagram of a control device provided in the apparatus of FIG. 1.

FIG. 3 shows a center process unit (control means) 53 for controlling the whole laminating apparatus.

The center process unit 53 is electrically connected to a sheet supply control portion 55, a sheet discharge control portion 56, a convey control portion 57, a temperature control portion 59, the laminate film cutting device 13, an abnormal condition detect means 62, the first sheet detect sensor 3, the second sheet detect sensor 7, the discharge sheet detect sensor 15 and a clock means 67.

The sheet supply control portion 55 serves to control ON/OFF of the drive motor 40 for driving the sheet supply roller 5, and ON/OFF of the solenoid for driving the register shutter 6. The sheet discharge control portion 56 serves to control ON/OFF of the drive motor 41 for driving the pair of sheet discharge rollers 16. The convey control portion 57 serves to control ON/OFF of the drive motor 23 for driving the paired pressure rollers 10 and the paired pull rollers 12. The temperature control portion 59 serves to control the temperature of the laminate heaters 21A, 21B by turning ON/OFF halogen lamps (not shown) incorporated into the laminate heaters 21A, 21B.

The laminate film cutting device 13 serves to cut the laminate films 19A, 19B in registration with the leading end and the trailing end of the sheet S which was laminated by the films. The abnormal condition detect means 62 serves to detect an abnormal condition of the laminating apparatus, such as abnormal increase in temperature of the laminate heater 21A and/or 21B, breaking of wire in the circuit or the like. The first sheet detect sensor 3 detects whether there is the sheet S on the sheet supply table 2. The second sheet detect sensor 7 detects the leading end and the trailing end of the sheet S supplied from the sheet supply table 2. The sheet discharge detect sensor 15 serves to detect whether the sheet S which has been subjected to the laminating treatment is discharged out of the apparatus by the paired discharge rollers 16. The clock means 67 is the clock device 52 for outputting a clock signal by utilizing the rotation of the output shaft 25 of the drive motor 23 for driving the pair of pressure rollers 10 and the pair of the pull rollers 12.

Next, the control in the center process unit 53 will be explained with reference to FIGS. 4, 5, 6 and 7.

Figure 4:
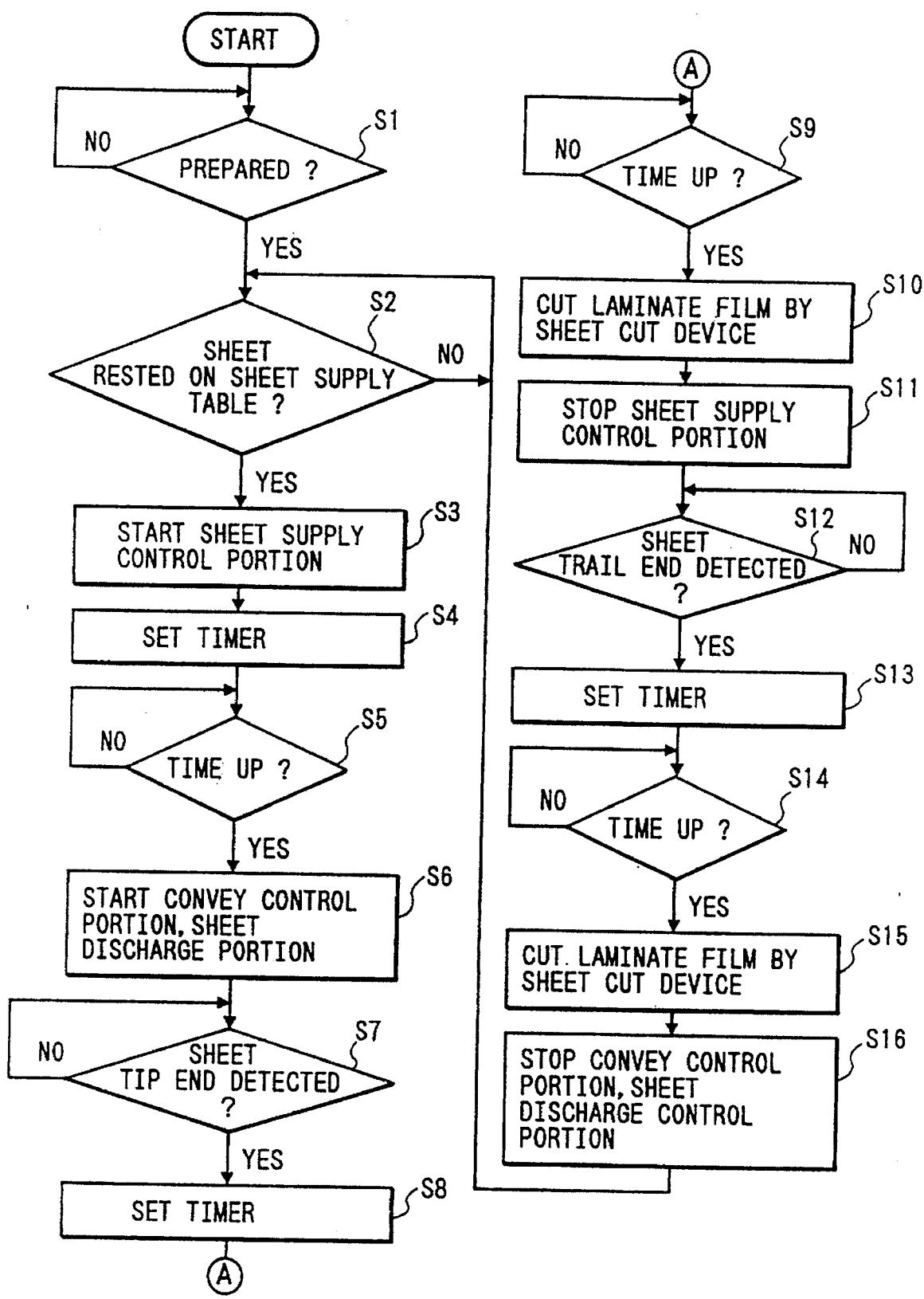
FIG. 4 is a flow chart showing a first example of the control effected by the control device of FIG. 3.

FIG. 4 shows a first example of the control.

First of all, it is judged whether a condition for starting the laminating operation is established (prepared) or not (step S1). When the laminating operation starting condition is established, the sheet S is set on the sheet supply table 2 to wait until the sheet is detected by the first sheet detect sensor 3 (step S2). When the sheet S is detected by the first sheet detect sensor, the sheet supply control portion 55 is started to operate (step S3), thereby supplying the sheet S.

Then, a timer for obtaining the timing for driving the convey control portion 57 and the sheet discharge control portion 56 is set (step S4), and the time-up of the timer is awaited (step S5). When the set time has expired, the convey control portion 57 and the sheet discharge control portion 56 are start to operate (step S6), thereby conveying the sheet S and the laminate films 19A, 19B and discharging the laminated sheet S.

Then, it is judged whether the leading end of the sheet S is detected by the second sheet detect sensor 7 (step S7). If the leading end of the sheet S is detected, a timer for obtaining the timing when the laminate film cutting device 13 cuts the laminate films 19A, 19B in registration with the leading end of the laminated sheet S and the timing when the sheet supply control portion 55 is stopped is set (step S8), and the time-up of the timer is awaited (step S9). When the set time has expired, the laminate film cutting device 13 starts to operate (step S10), thereby cutting the laminate films 19A, 19B in registration with the leading end of the laminated sheet S. Then, the sheet supply control portion 55 is stopped (step S11).

Then, it is judged whether the trailing end of the sheet S is detected by the second sheet detect sensor 7 (step S12). If the trailing end of the sheet S is detected, a timer for obtaining the timing when the laminate film cutting device 13 cuts the laminate films 19A, 19B in registration with the trailing end of the laminated sheet S and the timing when the convey control portion 57 and the sheet discharge control portion 56 are stopped is set (step S13), and the time-up of the timer is awaited (step S14). When the set time has expired, the laminate film cutting device 13 is started to operate (step S15), thereby cutting the laminate films 19A, 19B in registration with the trailing end of the laminated sheet S. Then, the convey control portion 57 and the sheet discharge control portion 56 are stopped (step S16). Then, the sequence returns to the step S2.

Figure 5:
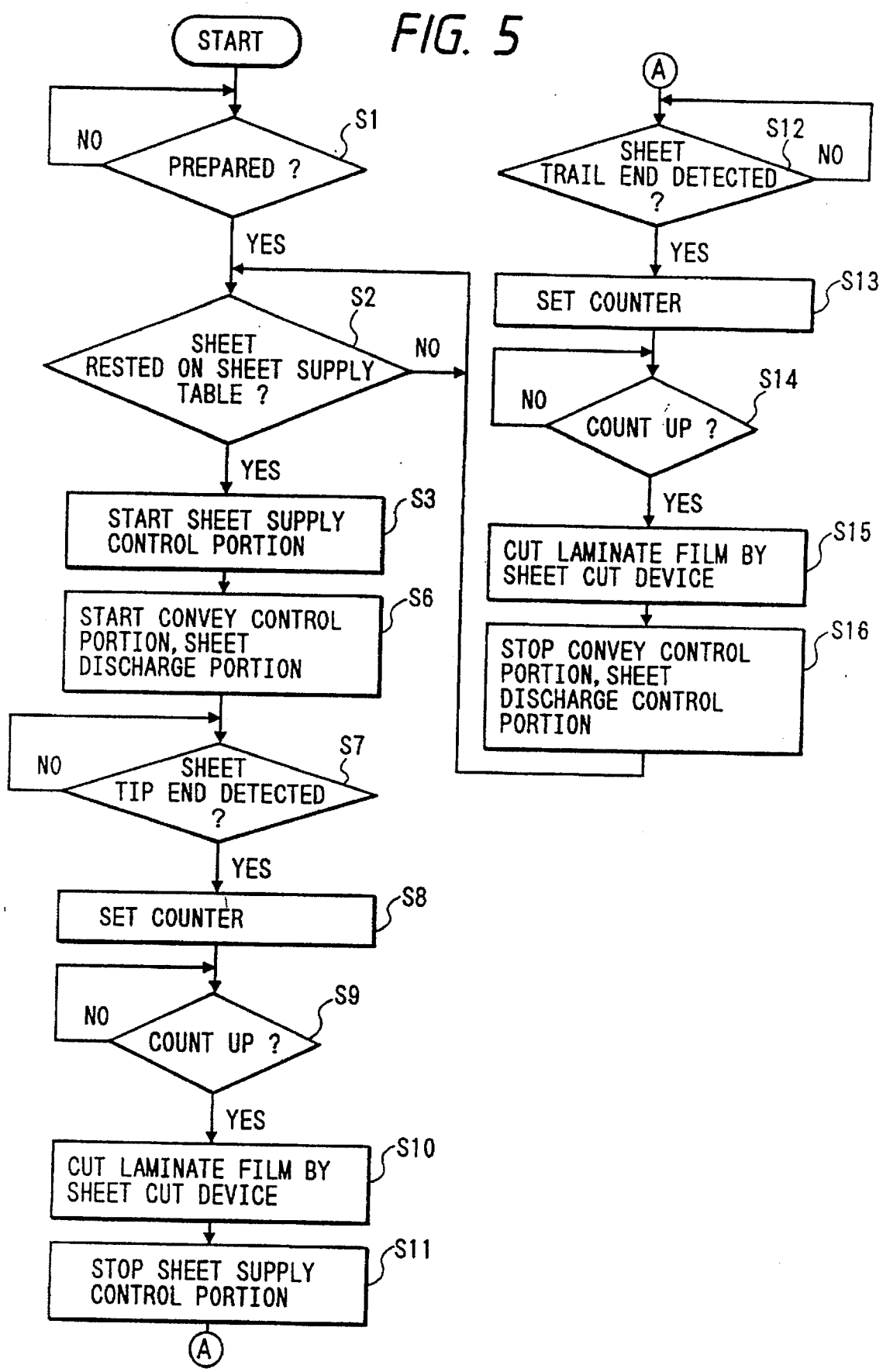
FIG. 5 is a flow chart showing a second example of the control effected by the control device of FIG. 3.

Incidentally, in this example, while the timing when the laminate film cutting device 13 cuts the laminate films 19A, 19B in registration with the leading and trailing ends of the laminated sheet S and the timing for starting and stopping the convey control portion 55 and the like were obtained by using the timers, as shown in FIG. 5, such timings may be obtained by using counter(s) capable of counting on the basis of a clock signals sent from the clock means 67.

Figure 6:
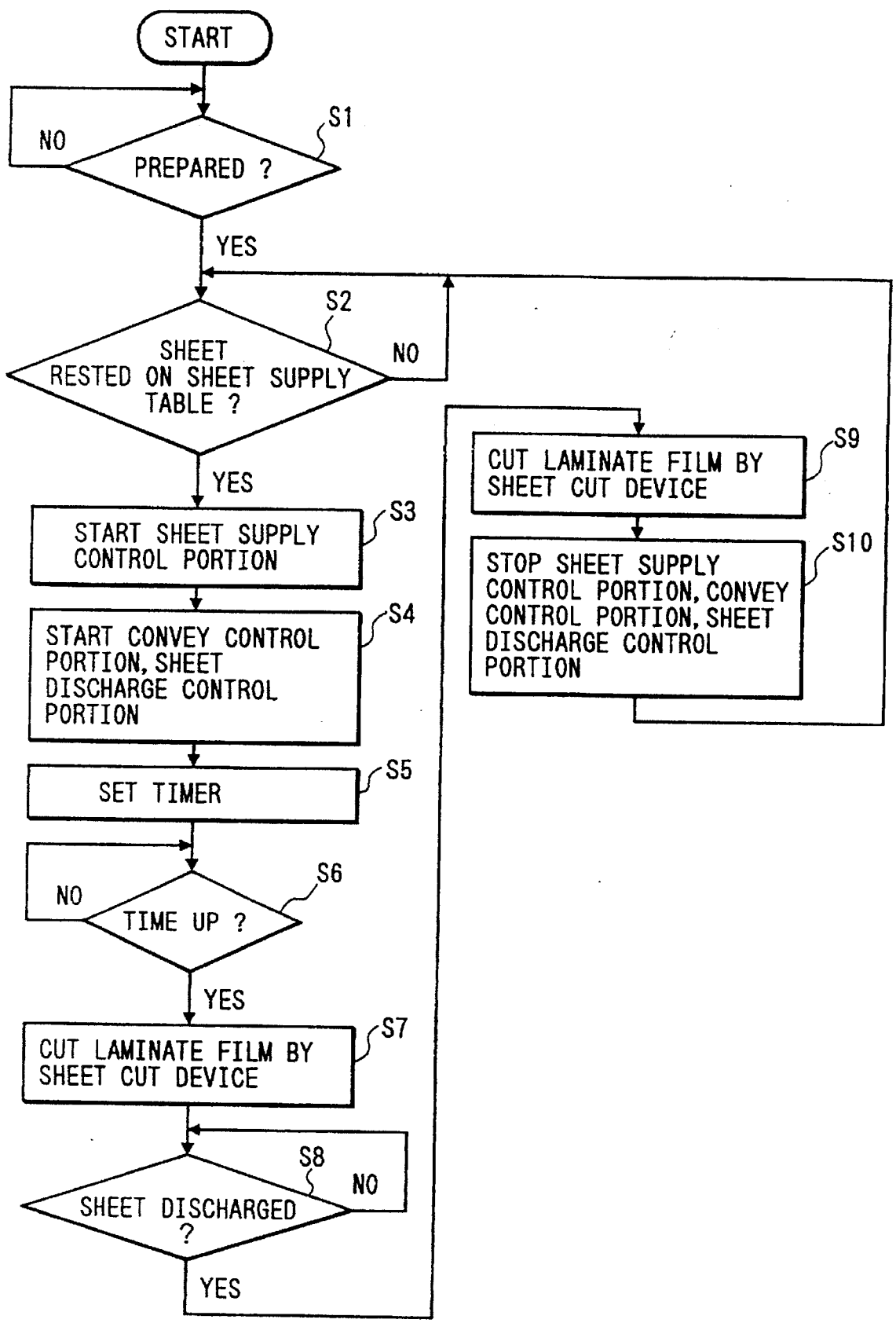
FIG. 6 is a flow chart showing a third example of the control effected by the control device of FIG. 3.

FIG. 6 shows a second example of the control.

First of all, it is judged whether a condition for starting the laminating operation is established (prepared) or not (step S1). When the laminating operation starting condition is established, the sheet S is set on the sheet supply table 2 to wait until the sheet is detected by the first sheet detect sensor 3 (step S2). When the sheet S is detected by the first sheet detect sensor, the sheet supply control portion 55 is started to operate (step S3), thereby supplying the sheet S. Then, the convey control portion 57 and the sheet discharge control portion 56 are started to operate (step S4), thereby conveying the sheet S and the laminate films 19A, 19B and discharging the laminated sheet S.

Then, a timer for obtaining the timing when the laminate film cutting device 13 cuts the laminate films 19A, 19B in registration with the leading end of the laminated sheet S is set (step S5), and the time-up of the timer is awaited (step S6). When the set time has expired, the laminate film cutting device 13 starts to operate (Step S7), thereby cutting the laminate films 19A, 19B in registration with the leading end of the laminated sheet S.

Then, it is judged whether the sheet discharge detect sensor 15 detects the fact that the sheet S was discharged out of the apparatus (step S8). When the discharge of the sheet S is detected, the laminate film cutting device 13 starts to operate (step S9), thereby cutting the laminate films 19A, 19B in registration with the trailing end of the laminated sheet S. Then, the sheet supply control portion 55, the convey control portion 57 and the sheet discharge control portion 56 are stopped (step S10). Then, the sequence returns to the step S2.

Figure 7:
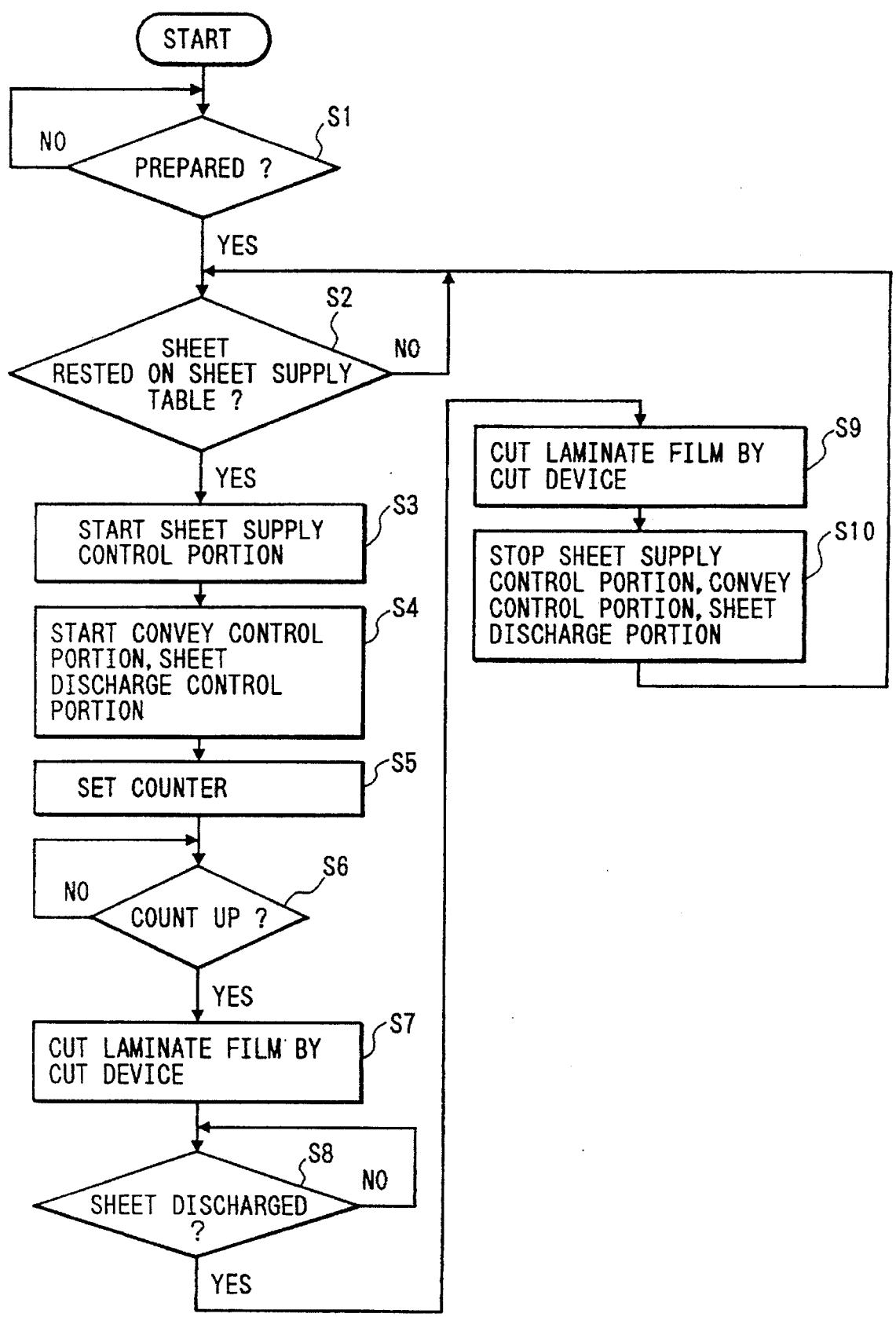
FIG. 7 is a flow chart showing a fourth example of the control effected by the control device of FIG. 3.
Figure 8:
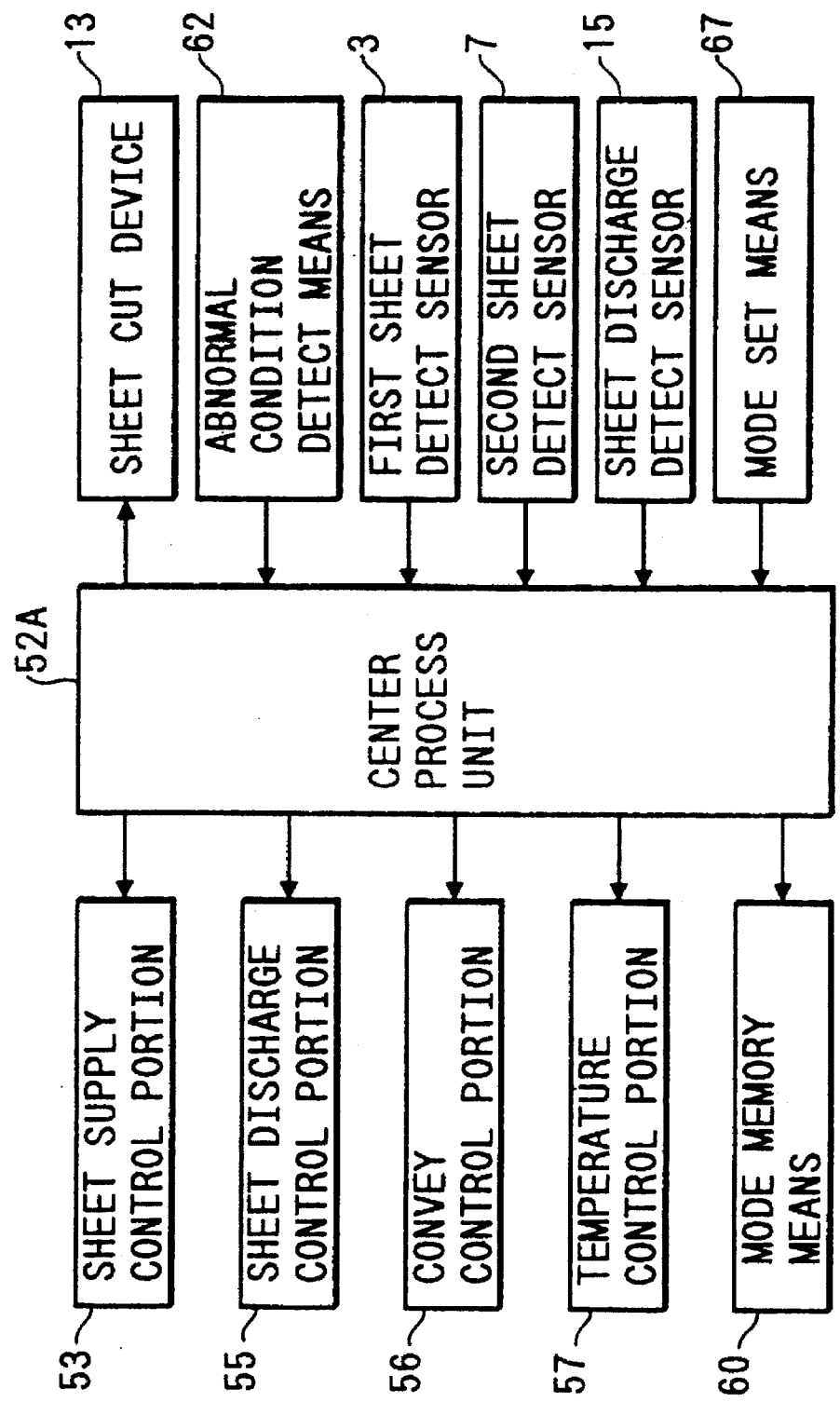
FIG. 8 is a block diagram of a control device according to another embodiment, provided in the apparatus of FIG. 1.

Incidentally, in this example, while the timing when the laminate film cutting device 13 cuts the laminate films 19A, 19B in registration with the leading end of the laminated sheet S was obtained by using the timer, as shown in FIG. 7, such timing may be obtained by using a counter capable of counting on the basis of a clock signals sent from the clock means 67.

As mentioned above, in the first example of the control, since the laminate film cutting device is driven and the laminating operation is stopped at the predetermined timings obtained on the basis of the detection of the trailing end of the supplied sheet by means of the second sheet detect sensor for detecting the leading and trailing ends of the sheet, the accuracy of the timing when the laminate film cutting device cuts the laminate films in registration with the trailing end of the laminated sheet and the accuracy of the timing for stopping the laminating operation can be improved. Thus, the laminated sheet can be prevented from remaining within the laminating apparatus and from being cut.

Further, in the second example of the control, since the laminate film cutting device is driven to cut the laminated sheet in registration with the trailing end of the laminated sheet and the laminating operation is stopped on the basis of the detection of the discharge of the laminated sheet by means of the sheet discharge detect sensor, the cutting of the laminate films and the stop of the laminating operation can be effected at the timing which is suitable to the convey condition. Thus, the laminated sheet can be prevented from remaining within the laminating apparatus and from being cut erroneously.

Next, another example of a center process unit (control means) for controlling the laminating apparatus will be described.

A center process unit 52A can control a "normal mode" for performing the laminating treatment regarding a sheet S of a fixed form, and a "continuous mode" for performing the laminating treatment regarding a sheet S of an indeterminate form.

The center process unit 52A is electrically connected to a sheet supply control portion 53, a sheet discharge control portion 55, a convey control portion 56, a temperature control portion 57, mode memory means 60, a laminate film cutting device 13, abnormal condition detect means 62, a first sheet detect sensor 3, a second sheet detect sensor 7, a discharge sheet detect sensor 15 and a mode set means 67.

The sheet supply control portion 53 serves to control ON/OFF of a drive motor 40 for driving a sheet supply roller 5, and ON/OFF of a solenoid for driving a register shutter 6. The sheet discharge control portion 55 serves to control ON/OFF of a drive motor 41 for driving a pair of sheet discharge rollers 16. The convey control portion 56 serves to control ON/OFF and a rotation speed of a drive motor 23 for driving a pair of pressure rollers 10 and a pair of pull rollers 12. The temperature control portion 57 serves to control the temperature of laminate heaters 21A, 21B by turning ON/OFF halogen lamps (not shown) incorporated into the laminate heaters 21A, 21B. The mode memory means 60 serves to store the operation modes and comprises a RAM (random access memory), for example.

The laminate film cutting device 13 serves to cut the laminate films 19A, 19B in registration with the leading end and the trailing end of the sheet S which was laminated by the films. The abnormal condition detect means 62 serves to detect an abnormal condition of the laminating apparatus, such as abnormal increase in temperature of the laminate heater 21A and/or 21B, breaking of wire in the circuit or the like. The first sheet detect sensor 3 detects whether there is the sheet S on a sheet supply table 2. The second sheet detect sensor 7 detects the leading end and the trailing end of the sheet S supplied from the sheet supply table 2. The sheet discharge detect sensor 15 serves to detect whether the sheet S which has been subjected to the laminating treatment is discharged out of the apparatus by a pair of discharge rollers 16. The mode set means 67 serves to manually set the operation mode to select either the "normal mode" or the "continuous mode" and comprises a push button switch as shown in FIG. 1, for example.

Figure 9:
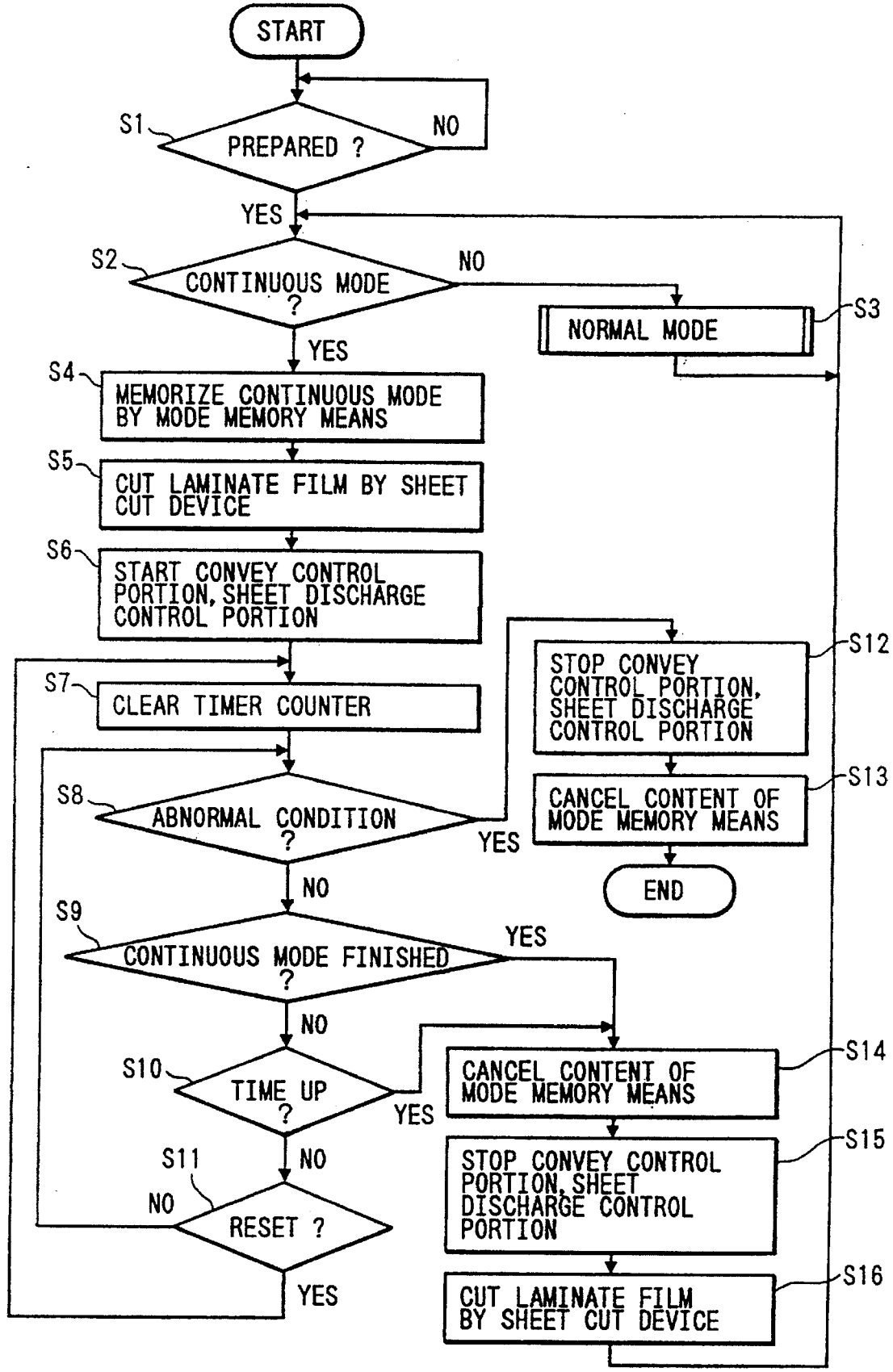
FIG. 9 is a flow chart showing an example of the control effected by the control device of FIG. 8.

Next, the control in the center process unit 52A will be explained with reference to FIG. 9.

First of all, it is judged whether a condition for starting the laminating operation is established (prepared) or not (step S1). When the laminating operation starting condition is established, by the mode set means 67, it is judged whether the "continuous mode" is set or not (step S2). If the "continuous mode" is not set, the control in the "normal mode" is effected (step S3). After the control is finished, the sequence returns to the step S2. When the laminating operation is effected under the "normal mode", the jam detection is continued by the sheet discharge detect sensor 15.

On the other hand, if the "continuous mode" is set by the mode set means 67, the operation mode is memorized by the mode memory means 60 (step S4), and then, the laminate film cutting device 13 is driven (step S5) to cut the laminate films 19A, 19B in registration With the leading end of the sheet S. Then, the sheet discharge control portion 55 and the convey control portion 56 are started to operate (step S6), thereby conveying the sheet S and the laminate films 19A, 19B and discharging the cut laminate films 19A, 19B.

Then, the count in a .timer is cleared (step S7), and it is judged whether an abnormal signal is emitted from the abnormal condition detect means 62 (step S8). If there is no abnormality, it is judged whether the "continuous mode" is finished (step S9). Then, it is judged whether the timer is timed up (step S10). If not yet timed up, it is judged whether the "continuous mode" is set again by the mode set means 67 (step S11). If not set again, the sequence returns to the step S8; whereas, if set again, the sequence returns to the step S7.

In the step S8, if there is an abnormality, the sheet discharge control portion 55 and the convey Control portion 56 are stopped (step S12), and then, the contents stored in the mode memory means 60 is cancelled (step S13). In this way, the sequence is ended. In this steps S9 and S10, if the "continuous mode" has been finished or if the timer has been timed up, the contents stored in the mode memory means 60 is cancelled (step S14). Then, the sheet discharge control portion 55 and the convey control portion 56 are stopped (step S15), and the laminate film cutting device 13 is started to operate (step S16), thereby cutting the laminate films 19A, 19B in registration with the trailing end of the laminated sheet S. Then, the sequence returns to the step S2.

Incidentally, in this example, while if there was an abnormality in the step S8 the sheet discharge control portion 55 and the convey control portion 56 were stopped, the power supply to the laminating apparatus may be disconnected.

As mentioned above, since the laminate operation mode can be switched to either the "normal mode" or the "continuous mode" by the mode set means, even in the case where the laminating treatment regarding a sheet of an indeterminate form is effected, when the "continuous mode" is selected by the mode set means, there is no need to monitor the laminating operation.

Further, when the "continuous mode" is selected by the mode set means, since the laminate film cutting device is driven on the basis of such selection or the release of selection, even in the case where the laminating treatment regarding a sheet of an indeterminate form is effected, the laminate films can be cut in registration with the leading and trailing ends of the laminated sheet.

What is claimed is:

1. A laminating apparatus, comprising:
   film convey means for drawing out and conveying a continuous laminate film;
   pressure means for overlapping the continuous laminate film conveyed by said film convey means on a sheet of a fixed length and for pressurizing the continuous laminate film onto the sheet;
   convey means for conveying the sheet on which the continuous laminate film is overlapped;
   film cutting means disposed downstream of said pressure means for cutting the laminate film overlapped on the sheet at a predetermined position;
   a single sheet detect sensor disposed upstream of said film cutting means for detecting passage of a leading end and a trailing end of the sheet; and
   control means for controlling said film cutting means based on detection by said sheet detect sensor in such a manner that the continuous laminate film is cut at a position where ends of the laminate film protrude from the leading end and the trailing end.

2. A laminating apparatus according to claim 1, wherein said control means drives said film cutting means to cut the laminate film at a predetermined timing after the leading end of the sheet is detected by said sheet detect sensor.

3. A laminating apparatus according to claim 1, wherein said control means drives said film cutting means to cut the laminate film at a predetermined timing after the trailing end of the sheet is detected by said sheet detect sensor.

4. A laminating apparatus according to claim 1, further comprising a sheet supply table on which the sheet is rested, sheet supply means for supplying the sheet on said sheet supply table and sheet presence/absence detect means for detecting the sheet on said sheet supply table, and wherein said control means drives said sheet supply means to supply the sheet when said sheet presence/absence detect means detects the sheet.

5. A laminating apparatus according to claim 1, further comprising heating means for heating the laminate film.

6. A laminating apparatus according to claim 5, wherein said pressure means comprises a pair of rollers, and said heating means are disposed within said rollers, so that the laminate film and the sheet are simultaneously heated and pressurized.

7. A laminating apparatus according to claim 1, wherein the laminate film comprises a wound roll and the laminate film is fed from said wound roll to be used in a laminating operation.

8. A laminating apparatus according to claim 7, further comprising a pair of laminate film wound rolls, and the laminate films are fed from said respective rolls so as to overlap the sheet from both sides thereby sandwiching the sheet by the laminate films.

9. A laminating apparatus, comprising:
   film convey means for drawing out and conveying a continuous laminate film;
   pressure means for overlapping the continuous laminate film conveyed by said film convey means on a sheet of a fixed length and for pressurizing the continuous laminate film onto the sheet;
   convey means for conveying the sheet on which the continuous laminate film is overlapped;
   film cutting means disposed downstream of said pressure means for cutting the laminate film overlapped on the sheet at a predetermined position;
   first sheet detect means disposed upstream of said film cutting means for detecting passage of a leading end of the sheet of a fixed length;
   second sheet detect means disposed downstream of said film cutting means for detecting passage of a trailing end of the sheet of a fixed length; and
   control means for controlling said film cutting means based on detections by said first and second detect means in such a manner that the continuous laminate film is cut at a position where ends of the laminate film are protrude from a leading end and a trailing end.

10. A laminating apparatus according to claim 9, wherein said control means drives said film cutting means to cut the laminate film at a predetermined timing after the leading end of the sheet is detected by said sheet leading end detect means.

11. A laminating apparatus according to claim 9, wherein said control means drives said film cutting means to cut the laminate film at a predetermined timing after the trailing end of the sheet is detected by said sheet trailing end detect means.

12. A laminating apparatus according to claim 9, further comprising discharge means disposed at a downstream side of said sheet discharge detect means and adapted to discharge the sheet which has been laminated with the laminate film Out of the laminating apparatus.

13. A laminating apparatus according to claim 9, further comprising a sheet supply table on which the sheet is rested, sheet supply means for supplying the sheet on said sheet supply table and sheet presence/absence detect means for detecting the sheet on said sheet supply table, and wherein said control means drives said sheet supply means to supply the sheet when said sheet presence/absence detect means detects the sheet.

14. A laminating apparatus, comprising:
   film convey means for drawing out and conveying a continuous laminate film;
   pressure means for overlapping the continuous laminate film conveyed by said film convey means on a sheet of fixed length and a sheet of variable length and for pressurizing continuous laminate film on one of them;

film cutting means disposed downstream of said pressure means for cutting the continuous laminate film overlapped on one of the sheets at a position that ends of the laminate film protrude from a leading end and a trailing end;

jam detect means for detecting the jamming of the sheet of a fixed length; and control means for controlling said jam detect means in an operative condition when the sheet of the fixed length is laminated to detect the jamming of the sheet, and in an inoperative condition when the sheet of variable length is laminated.

15. A laminating apparatus according to claim 14, further comprising sheet detect means for detecting the sheet conveyed by said sheet convey means, said control means controlling said film cutting means in such a manner that the laminate film is cut in a predetermined relation relative to leading and trailing ends of the sheet on the basis of detection by said sheet detect means.

16. A laminating apparatus according to claim 14, further comprising a sheet supply table on which the sheet is rested, sheet supply means for supplying the sheet on said sheet supply table and sheet presence/absence detect means for detecting the sheet on said sheet supply table, and wherein said control means drives said sheet supply means to supply the sheet when said sheet presence/absence detect means detects the sheet.

17. A laminating apparatus according to claim 1 further comprising sheet convey means for conveying the sheet to be laminated, and wherein said sheet detect means is disposed in said sheet convey means.

18. A laminating apparatus according to claim 17, wherein said sheet detect means is disposed at an upstream side of said pressure means in a sheet conveying direction by said sheet convey means.

* * * * *

UNITED STATES PATENT AND TRADEMARK OFFICE
CERTIFICATE OF CORRECTION

PATENT NO. : 5,653,846
DATED : August 5, 1997
INVENTOR(S) : Kazuo ONODERA et al.

It is certified that error appears in the above-identified patent and that said Letters Patent is hereby corrected as shown below:

COLUMN 1:
  Line 33, "switched" should read --switch--.

COLUMN 6:
  Line 6, "sensor." should read --sensor--;
  Line 15, "are" should be deleted; and
  Line 40, "is started" should read --starts--.

COLUMN 7:
  Line 24, "signals" should read --signal--.

COLUMN 8:
  Line 48, "With" should read --with--;
  Line 50, "are started" should --start--;
  Line 54, ".timer" should read --timer--; and
  Line 65, "Control" should read --control--.

UNITED STATES PATENT AND TRADEMARK OFFICE
CERTIFICATE OF CORRECTION

PATENT NO. : 5,653,846
DATED : August 5, 1997
INVENTOR(S) : Kazuo ONODERA et al.

It is certified that error appears in the above-identified patent and that said Letters Patent is hereby corrected as shown below:

COLUMN 9:
  Line 1, "this" should read --these--; and
  Line 6, "is started" should read --starts--.

COLUMN 10:
  Line 37, "are" should be deleted; and
  Line 51, "Out" should read --out--.

COLUMN 12:
  Line 10, "claim 1 should read --claim 1--.

Signed and Sealed this

Thirty-first Day of March, 1998

Attest:

BRUCE LEHMAN

Attesting Officer     Commissioner of Patents and Trademarks